United States Patent
Hold et al.

(10) Patent No.: US 9,726,169 B2
(45) Date of Patent: Aug. 8, 2017

(54) COMPRESSOR COMPRISING PURGING AND METHOD FOR PURGING THE COMPRESSOR HOUSING WITH PURGE GAS

(71) Applicant: Hoerbiger Kompressortechnik Holding GmbH, Vienna (AT)

(72) Inventors: Christian Hold, Bisamberg (AT); Matthias Kornfeld, Mödling (AT)

(73) Assignee: Hoerbiger Kompressortechnik Holding GmbH, Vienna (AT)

( * ) Notice: Subject to any disclaimer, the term of this patent is extended or adjusted under 35 U.S.C. 154(b) by 535 days.

(21) Appl. No.: 14/482,161

(22) Filed: Sep. 10, 2014

(65) Prior Publication Data
US 2015/0086388 A1    Mar. 26, 2015

(30) Foreign Application Priority Data
Sep. 23, 2013   (AT) ................ A50608/2013

(51) Int. Cl.
*F04B 53/02*        (2006.01)
*F04B 53/06*        (2006.01)
(Continued)

(52) U.S. Cl.
CPC .......... *F04B 53/02* (2013.01); *F04B 39/0207* (2013.01); *F04B 39/0276* (2013.01);
(Continued)

(58) Field of Classification Search
CPC .. F04B 53/02; F04B 39/0207; F04B 39/0276; F04B 39/0292; F04B 53/04; F04B 53/06;
(Continued)

(56) References Cited

U.S. PATENT DOCUMENTS 2,660,367 A * 11/1953 Ehlinger ............... F04D 29/063
                                                            277/348
4,350,349 A    9/1982 McTavish
(Continued)

FOREIGN PATENT DOCUMENTS

EP          1146264        10/2001
JP      EP 0228040 A1  *  7/1987 ........... F04D 29/104

OTHER PUBLICATIONS

English Abstract of EP 1146264.

*Primary Examiner* — Devon Kramer
*Assistant Examiner* — Thomas Cash
(74) *Attorney, Agent, or Firm* — Dykema Gossett PLLC

(57) ABSTRACT

In order to prevent working medium from accumulating in the compressor housing (2) of a piston compressor (1) in a simple manner by means of a sealing of the piston rod (7) in the form of sealing medium barrier supplied by a hydraulic unit (12), it is provided that a ventilator (32) and a sealing medium container (37), which is partially filled with sealing medium, are provided in the hydraulic unit (12), wherein the ventilator (32) suctions air from the free space of the sealing medium container (37), and the free space (45) in the sealing medium container (37) is connected via a line (15, 17) to the compressor housing (2), and an opening (16) is provided at the compressor housing (2) for connecting the interior of the compressor housing (2) to a purge gas reservoir (18).

7 Claims, 2 Drawing Sheets

Figure 1:
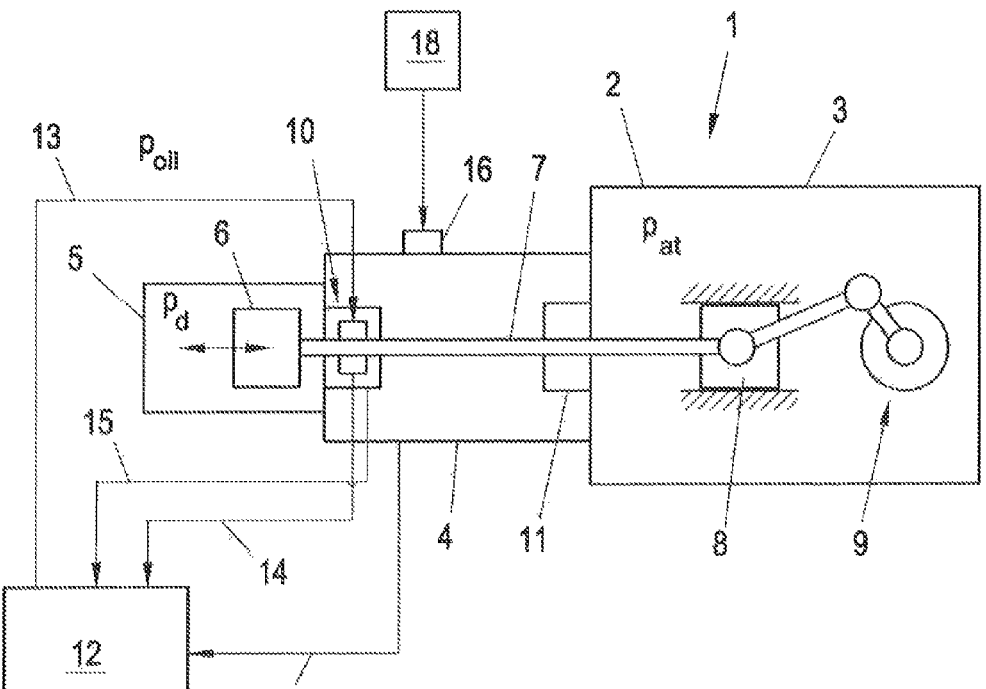

(51) Int. Cl.
    *F04B 53/04*     (2006.01)
    *F16J 15/40*     (2006.01)
    *F16J 15/16*     (2006.01)
    *F04B 39/04*     (2006.01)
    *F04B 39/02*     (2006.01)

(52) U.S. Cl.
    CPC ........ *F04B 39/0292* (2013.01); *F04B 39/041* (2013.01); *F04B 53/04* (2013.01); *F04B 53/06* (2013.01); *F16J 15/16* (2013.01); *F16J 15/40* (2013.01)

(58) Field of Classification Search
    CPC . F04B 39/041; F16J 15/16; F16J 15/40; F16J 15/26
    USPC .......... 217/15; 96/212; 384/536; 184/58, 59; 417/228
    See application file for complete search history.

(56) References Cited

U.S. PATENT DOCUMENTS

| | | | |
|---|---|---|---|
| 4,734,018 A * | 3/1988 | Taniyama | F04D 29/104 277/419 |
| 6,439,578 B1 | 8/2002 | Radcliffe | |
| 7,118,114 B2 * | 10/2006 | Burdick | F16J 15/004 277/510 |
| 2011/0298183 A1 * | 12/2011 | Lindner-Silwester | F04B 39/0022 277/500 |

* cited by examiner

COMPRESSOR COMPRISING PURGING AND METHOD FOR PURGING THE COMPRESSOR HOUSING WITH PURGE GAS

The subject matter of the invention relates to a piston compressor comprising a sealing arrangement arranged in a compressor housing for sealing a reciprocating piston rod of the piston compressor, the sealing arrangement having a first and a second sealing element which are arranged axially spaced apart in a recess of the sealing arrangement, wherein a feed line for a sealing medium is provided, which feed line is connected to the recess, and the sealing elements are pressurized by the sealing medium, and wherein a hydraulic unit is provided for generating the pressure of the sealing medium, and to a method for purging a compressor housing.

In a piston compressor, the space under high pressure, e.g., under the operating pressure in the cylinder of the compressor, is to be sealed along the piston rod with respect to a space under low pressure, e.g. the atmospheric pressure in the crankcase of the compressor. For this, so-called sealing packs are used in a known manner which seal between the reciprocating piston rod of the compressor housing and a stationary machine component, normally the compressor housing. Such a sealing pack normally comprises a plurality of packing rings or packing ring combinations that are axially arranged one behind the other. Combinations of a radially cut and a tangentially cut packing ring are used most frequently, as set forth, e.g., in EP 1 146 264 A2. In addition, segmented ring designs in which a packing ring is composed of a plurality of ring segments are also used, as is known, e.g., from U.S. Pat. No. 4,350,349 A. However, such seals are not 100% leak-proof systems; rather, they always have a certain amount of leaking working medium escaping through the seal.

In order to reduce the problem of leakage, it has already been proposed in WO 2010/079227 A1 to use for sealing two axially spaced sealing elements between which a sealing medium, e.g., oil, is introduced with high pressure so that the sealing elements for sealing are pressed against sealing surfaces provided in the sealing pack and against the piston rod. In this manner, a sealing medium barrier is created which at least reduces, and ideally and desirably even eliminates, the leakage of the working medium of the compressor such as, e.g., air or natural gas, along the piston rod. However, a leakage of sealing medium between the sealing element and the piston rod can occur, mainly due to the sealing medium film that adheres on the surface of the reciprocating piston rod and is transported out of the sealing arrangement and is wiped off by the sealing element during the stroke of the piston rod in the opposite direction. The wiped-off sealing medium is collected and is fed back into a sealing medium reservoir via a leakage line.

Although the sealing arrangement comprising a sealing medium barrier prevents working medium from leaking along the piston rod to the largest possible extent, working medium leakage can occur at other places in the compressor or in the sealing arrangement. The sealing arrangement normally consists of a number of a chamber plates that are arranged axially next to one another and are held together by means of bolts passing therethrough. The sealing arrangement is inserted as a structural unit into the compressor and is secured therein. The front surfaces of the chamber plates serve here at the same time as sealing surfaces. Between the compressor housing and the sealing arrangement, seals are inserted. However, through sealing surfaces between the chamber plates as well as through the seals, small amounts of working medium can escape which can accumulate in the compressor housing, e.g., in the crankcase or in a spacer between the crankcase and the cylinder. In a sealing arrangement according to the subject matter, a working medium leakage of 5 nl/h is assumed, which, due to the long operating times of compressors over a long time period can also result in a high concentration of working medium in the compressor housing. However, specifically in the case of toxic (e.g. ammonia) or explosive (e.g., hydrogen, natural gas) working media, this can pose a great problem and thus has to be prevented. In particular, formation of an explosive gas mixture in the compressor housing caused by leakage of working medium is to be prevented. For safety reasons, the concentration of working medium in the compressor housing therefore has to be kept below a given concentration limit.

Thus, ventilation openings are often provided in the compressor housing, optionally in combination with purge gas feed lines, for forced purging of the compressor with an inert gas (e.g. nitrogen). However, this, of course, necessarily requires providing a separate purge gas circuit with adequate aggregates and purge gas storages, resulting in undesirable extra costs for equipment and control components. Purging with purge gas can also result in mixing of purge gas and working medium and in the escape of the mixture to the outside via the ventilation openings. Due to the density differences between the purge gas and the working medium it is also possible that undiluted working medium escapes to the outside via the ventilation opening, which likewise is to be prevented. Retrofitting compressors with such a purge system causes major reconstruction work on the compressor, which makes such retrofitting costly and difficult.

It is therefore an object of the present invention to disclose a compressor comprising a sealing arrangement in the form of a sealing medium barrier and to disclose an associated method by means of which accumulation of working medium in the compressor housing can be prevented in a simple manner.

According to the invention, this object is achieved in that a ventilator and a sealing medium container, which is partially filled with sealing medium, are provided in the hydraulic unit, wherein the ventilator suctions air from the free space of the sealing medium container, and the free space in the sealing medium container is connected via a line to the compressor housing, and an opening is provided at the compressor housing for connecting the interior of the compressor housing to a purge gas reservoir, preferably the surrounding area of the compressor. The ventilator in the hydraulic unit, which in principle is used for cooling the hydraulic unit or the sealing medium, is thus utilized at the same time for generating negative pressure in the compressor housing or in a part thereof, wherein the generated negative pressure is used in a simple manner for permanently or temporarily purging the compressor housing with purge gas, preferably ambient air. Accumulation of working medium of the compressor in the compressor housing can be reliably kept in this manner below a predetermined concentration limit, even in the case of long operating times.

If a ventilation chamber with a ventilator arranged therein is provided in the hydraulic unit and the ventilation chamber is connected to the free space in the sealing medium container, a compact design of the hydraulic unit can be achieved. It is also advantageous here if the sealing medium container is closed by a separating part and if a recess is arranged in the separating part, via which recess the ventilator suctions air from the sealing medium container.

For this purpose, the line can be configured as a drainage line for sealing medium or as a separate suction line, wherein in particular the configuration with the drainage line is preferred since such a drainage line is provided anyway and thus can also be used at the same time for purging the compressor housing.

The sealing medium can be effectively cooled if a heat exchanger is provided through which the sealing medium from the sealing medium container is circulated and over which the air flow flows that is blown out by the ventilator.

Figure 2:
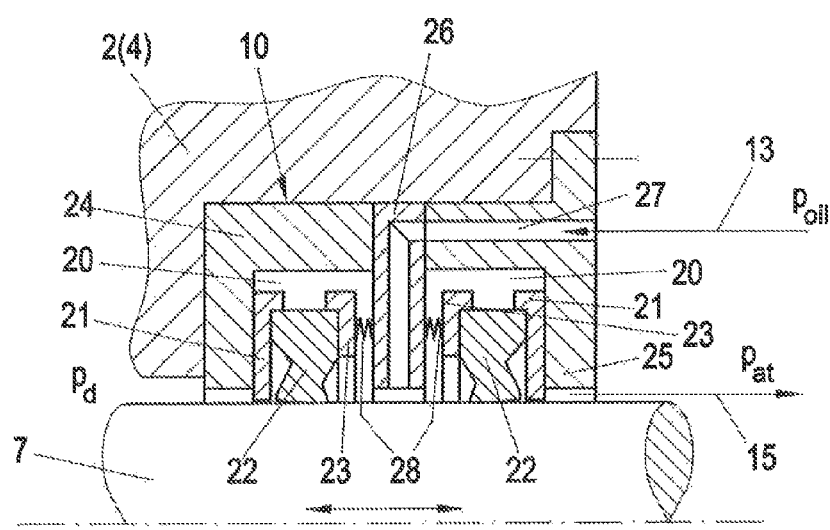
Figure 3:
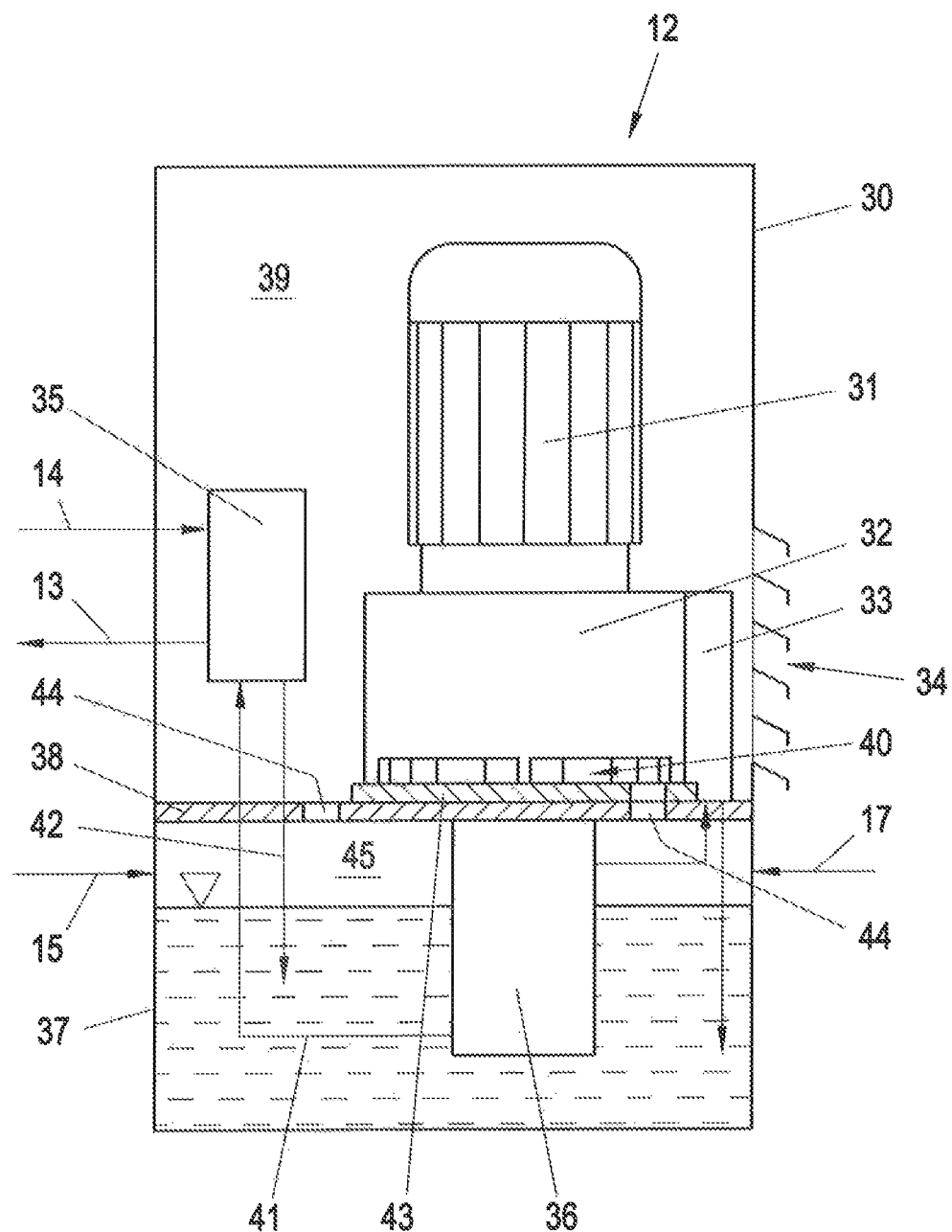

The present invention is explained in greater detail below with reference to the FIGS. 1 to 3, which show advantageous configurations of the invention in an exemplary, schematically and non-limiting manner. In the figures FIG. 1 shows a schematic illustration of a piston compressor according to the invention, FIG. 2 shows an embodiment of a sealing arrangement of the piston compressor, and FIG. 3 shows a schematic illustration of the hydraulic unit of such a piston compressor.

The piston compressor schematically illustrated in FIG. 1 consists of a compressor housing 2, comprising a crankcase 3 and a spacer 4 on which a cylinder 5 is arranged. The piston 6 is reciprocated in the cylinder 5 in a known manner. The piston 6 is connected to the reciprocating piston rod 7 which is connected to the crank mechanism 9 via a crosshead 8.

For sealing the piston rod 7, a first sealing arrangement 10 in the form of a sealing medium barrier is provided. The first sealing arrangement 10 is arranged here in the spacer 4. Between the spacer 4 and the crankcase 3, a second sealing arrangement 11 can be arranged, e.g. in the form of radially and tangentially cut or segmented sealing rings, known from the prior art, that are arranged axially next to one another. The sealing arrangement 11 can also comprise wiper rings by means of which crankcase oil can be wiped off from the piston rod 7. Likewise, a second spacer can also be provided, e.g., between the spacer 4 and the crankcase 3, wherein for sealing, a further sealing arrangement can also be provided in the further spacer.

The first sealing arrangement 10 is explained in greater detail with reference to FIG. 2. The sealing arrangement 1 serves for sealing the axially reciprocating piston rod 7 of the piston compressor 1 with respect to a pressure difference $p_d - p_{at}$ to be sealed of a compressor working medium located in the cylinder 5, e.g., the difference between the cylinder pressure $p_d$ and the pressure $p_{at}$ in the crankcase 3 or in the spacer 4. The sealing arrangement 10 is arranged in the compressor housing 2, here, e.g., in the housing of the spacer 4, and seals between the compressor housing 2 and the moving piston rod 7. The sealing arrangement 10 in the example shown comprises two L-shaped chamber plates 24, 25 which, in the illustrated exemplary embodiment, are axially separated by a separating plate 26. The L-shaped chamber plates 24, 25 and the separating plate 26 are arranged axially abutting each other and radially spaced apart from the piston rod 7 so as to prevent the piston rod 7 from rubbing against the chamber plates 24, 25 or the separating plate 26, and to enable mobility of the piston rod 7 transverse to the stroke movement (indicated by the double arrow). The orientations "axial" and "radial" refer to the orientation of the piston rod 7, thus axial is oriented in the direction of the longitudinal axis of the piston rod 7 and radial is oriented transversely thereto. In the simplest case, however, the separating plate 26 can also be omitted. However, other embodiments, e.g., with T-shaped separating plates or an L-shaped plate and a cylindrical plate are also conceivable. Also, radially on the outside of a chamber plate 25, a flange can be provided by means of which the sealing arrangement 10 can be fastened to the compressor housing 2, e.g., using screws that are arranged distributed over the circumference. The chamber plates 24, 25 and optionally the separating plate 26 or other plates can be held together in a known manner by non-illustrated bolts passing therethrough. Through this arrangement, a recess 20 is created between the L-shaped chamber plates 24, 25, optionally the separating plate 26, and the piston rod 7, in which recess two sealing elements 22 are arranged axially spaced apart from one another. A sealing element 22 is preferably configured as a one-piece sealing ring that is uncut in the circumferential direction.

The sealing elements 22 can rest axially against the axial partition walls of the chamber plates 24, 25. As an alternative, support rings 21 can be provided against which the sealing elements rest axially, wherein the support rings 21 each rest axially against the axial partition wall of the recess 20, here, against the radial leg of the chamber plate 24, 25. The support rings 21 prevent that the sealing element 22 extrudes, due to the high pressure acting on the sealing element 22, into the annular gap between the chamber plate 24, 25 and the piston rod 7.

Furthermore, a feed line 27 is provided in the sealing arrangement 10, which feed line is connected to the recess 20 and via which a sealing medium such as, e.g., oil can be fed into the recess 20 under a pressure $p_{oil}$ that is higher than the pressure $p_d$ to be sealed. In the case of a dynamically changing working pressure $p_d$, naturally, $p_{oil} > p_{d,max}$ must apply, or the pressure of the sealing medium is dynamically adjusted to the pressure of the working medium so that always $p_{oil} > p_d$ applies. The sealing medium acts radially on the outside and axially on the sealing elements 22 which therefore are pressed against the partition walls of the recess 20 and thus provide sealing. Thereby, a sealing medium barrier is created that prevents the gaseous working medium to be sealed of the piston compressor 1 from leaking along the piston rod 7.

The sealing element 22 rests with its radially inner circumferential surface, or with a portion thereof, against the piston rod 7 against which it is pressed with the high pressure $p_{oil}$ of the sealing medium. This results in high frictional load which the sealing element 22 has to resist for a sufficiently long time. The sealing element 22 therefore is preferably made from a tribologically advantageous and, at the same time, mechanically highly loadable and temperature-stable material, preferably plastic material such as, e.g., modified polyetherketone (PEEK) or polyphenylene sulfide (PPS) materials. The pressure $p_{oil}$ of the sealing medium generates forces which act on the sealing element 22 and which press the sealing element 22 axially against the partition wall of the recess 20 or against the support ring 11 and radially against the piston rod 7. As a result, at a sealing medium pressure $p_{oil}$ of ca. 50 bar, friction forces in the amount of several hundred Newton, typically between 100 N and 250 N, and friction power in the amount of several hundred Watt, typically between 500 W and 1000 W, can occur between the sealing element 22 and the piston rod 7.

On that axial front surface of the sealing element 22 that faces towards the support ring 21 or the axial partition wall of the recess 20, a spring ring 23 can be placed on which a spring element 28 acts in the axial direction so as to axially preload the sealing element 22 against the partition wall of the recess 20. The spring element 28 can be arranged here between the spring ring 23 and an axial limit stop in the sealing arrangement 10, here, e.g., the separating plate 26.

The spring element 28 is implemented, e.g., in the form of a plurality of spiral springs that are distributed over the circumference. Thus, the position of the sealing element 22 at standstill of the piston compressor 1 is defined in order to enable a controlled startup of the piston compressor 1. It is also possible here that the spring ring 23 rests via a shoulder against the radially outer circumferential surface of the sealing element 22 in order to fix the radial position of the spring ring 23. The spring ring 23 is preferably configured as a rigid one-piece ring, e.g. a metallic ring.

In addition, apart from the necessary sealing element 22, further sealing elements or wiper rings can be arranged in the sealing arrangement 10, even in their own chamber plates, as described, e.g., in EP 2 489 907 A1 or WO 2010/079227 A1.

At the crankcase end, a drainage line 15 can also end in the sealing arrangement 10 in order to discharge sealing medium wiped off from the piston rod 7, as indicated in FIG. 2 and described in greater detail below.

For supplying the sealing arrangement 10, a hydraulic unit 12 is provided by means of which the sealing medium is fed with high pressure $p_{oil}$ to the sealing arrangement 10 via a sealing medium line 13 that is connected to the feed line 27 in the sealing arrangement 10. The sealing medium can be fed back again to the hydraulic unit 12 via a discharge line 14, e.g., in an optional circulation operation for the sealing medium.

By the reciprocating piston rod 7, the sealing medium film is transported out of the sealing arrangement 10 and wiped off by the piston rod, e.g., by means of its own wiper rings arranged in the sealing arrangement 10, or by the sealing element 22 itself. The wiped-off sealing medium is collected in the sealing arrangement 10 and is fed back to the hydraulic unit 12 via a drainage line 15.

The hydraulic unit 12 is described in greater detail with reference to FIG. 3. A drive motor 31 drives a hydraulic pump 36 which is arranged in a sealing medium container 37 or suctions sealing medium from the sealing medium container 37. In the exemplary embodiment shown, the drive motor 31 also drives a ventilator 32 at the same time. For this purpose, the ventilator 32 and the hydraulic pump 36 are arranged here axially one behind the other. Of course, the ventilator 32 could also be arranged separately and could have its own drive motor. The hydraulic pump 36 could also be arranged outside of the sealing medium container 37. All components of the hydraulic unit 12 are arranged in a unit housing 30.

The hydraulic pump 36 suctions sealing medium from the sealing medium container 37 and feeds the sealing medium via a pressure line 41 to a hydraulic control unit 35 for controlling the pressure $p_{oil}$ of the sealing medium and/or the volume flow of the sealing medium. The sealing medium line 13 is connected to the hydraulic control unit 35. Likewise, the discharge line 14 for recirculating the sealing medium from the sealing arrangement 10 can optionally be connected to the hydraulic control unit 35, for which reason a sump line 42 runs from the hydraulic control unit 35 back into the sealing medium container 37. However, the discharge line 14 can also run directly into the sealing medium container 37. The pressure $p_{oil}$ of the sealing medium thus can also be adjusted by pressure control devices in the discharge line 14. Under certain circumstances, the control unit 35 can also be dispensed with. The drainage line 15 from the sealing arrangement 10 ends in the sealing medium container 37.

For cooling the sealing medium in the sealing medium container 37, a heat exchanger 33 can be provided in the hydraulic unit 12, over which heat exchanger the air flow flows that is blown out by the ventilator 32 and through which the sealing medium is pumped, as indicated in FIG. 3. For this purpose, the heat exchanger 33 is arranged, e.g., between the ventilator 32 and outlet slots 34 in the unit housing 30. Also, a separate hydraulic pump can be provided for this.

The sealing medium container 37 is arranged here in the lower part of the hydraulic unit 12 and is closed by a separating part 38, e.g., a cover. The ventilator 32 and the drive motor 31 are arranged at the separating part 38. For this, a ventilator support 43 can be arranged at the separating part 38, which ventilator support rests on the separating part 38 and via which the ventilator 32 is fastened to the separating part 38, e.g., by means of screws. By the separating part 38, the interior of the hydraulic unit 12 or the unit housing 30 is divided into the sealing medium container 37, which is partially filled with sealing medium, and into a ventilator chamber 39 in which at least the ventilator 32 is arranged. However, the ventilator chamber 39 and the sealing medium container 37 can of course also be locally separated and can each be provided with its own housing.

The ventilator 32 suctions air from the ventilator chamber 39 via the suction slots 40 and blows the suctioned air to the outside via outlet slots 34, optionally via the heat exchanger 33. In the separating part 38, a recess 44, e.g., one or a plurality of holes is provided. Thus, the ventilator 32 suctions air not only from the ventilator chamber 39 but to a certain extent also from the sealing medium container 37, as a result of which negative pressure is generated in the free space 45 (the space that is not filled with sealing medium) of the sealing medium container 37. In the case of separate housings for the ventilator 32 and the sealing medium container 37, the sealing medium housing 37 would be connected in this case to the ventilator chamber 39 via the recess and a suitable line connected thereto. This negative pressure is utilized according to the invention for purging the compressor housing 2 with purge gas in order to keep the concentration of working medium in the compressor housing 2 below a certain limit. Here, purging is carried out permanently when the ventilator 32 runs, wherein a controller can be provided in the hydraulic unit for operating the ventilator 32, e.g., based on the temperature in the hydraulic unit or the temperature of the sealing medium. However, the ventilator 32 can also run permanently or can be coupled to the operating times of the piston compressor.

For this, the compressor housing 2, here, e.g., the spacer 4, is connected to the free space 45 in the sealing medium container 37 via a suction line 17 and thus is connected to negative pressure. Thus, negative pressure is also generated in the compressor housing 2, here, in the spacer 4, for example. In the compressor housing 2, an opening 16 is provided, e.g., in the form of a suitable valve, which connects the compressor housing 2 to a purge gas reservoir 18, in the simplest case to the surrounding area of the compressor, so that purge gas or, in the simplest case, ambient air is suctioned. In this manner, sufficient purging of the compressor housing 2, or of a part thereof (here, the spacer 4) with purge gas can be ensured. The purging volume can be adjusted here by adjusting the negative pressure, e.g., by corresponding dimensioning of the recess 44 in the separating part 38. The ventilator 32 provided in the hydraulic unit 12 thus can be used at the same time for permanently purging the compressor housing.

The recess 44 can preferably also be arranged in the region of the ventilator support 43, wherein a corresponding recess is also provided here in the ventilator support 43, as indicated in FIG. 3. Thus, the free space 45 in the sealing medium container 37 can be connected directly to the interior of the ventilator 32, whereby a particularly effective suction from the sealing medium container 37 can be achieved.

Due to the very small amounts of drainage of sealing medium, it is also possible to use the drainage line 15 instead of a separate suction line 17 for purging the compressor housing 2, whereby the suction line 17 can also be dispensed with. For this, the drainage line 15 simply needs to be connected to the interior of the compressor housing 2, or the drainage line 15 is already connected to the compressor housing 2 (which is usually the case) via the design configuration of the sealing arrangement 10.

It could also be provided for the operation of the piston compressor 1 that prior to starting up the piston compressor 1, the ventilator is operated for a given time period so as to first purge the compressor housing 2 before the piston compressor 1 is started up.

In order to further increase the operational safety of the piston compressor, a gas sensor can also be arranged in the compressor housing 2 in order to detect possible inadmissible gas concentrations of working medium which can occur, e.g., in the case of a failure of the purging system, and to switch off the piston compressor, if necessary, or to output an error message or warning message.

The invention claimed is:

1. A piston compressor comprising a sealing arrangement arranged in a compressor housing for sealing a reciprocating piston rod of the piston compresso, the sealing arrangement having a first and a second sealing element which are arranged axially spaced apart in a recess of the sealing arrangement, wherein a feed line for a sealing medium is provided, which feed line is connected to the recess, and the sealing elements are pressurized by the sealing medium, and wherein a hydraulic unit is provided for generating the pressure of the sealing medium, wherein a ventilator and a sealing medium container, which is partially filled with sealing medium, are provided in the hydraulic unit, wherein the ventilator suctions air from the free space of the sealing medium container, and that the free space in the sealing medium container is connected via a line to the compressor housing, and an opening is provided at the compressor housing for connecting the interior of the compressor housing to a purge gas reservoir.

2. The piston compressor according to claim 1, wherein a ventilator chamber is provided in the hydraulic unit, in which ventilator chamber the ventilator is arranged and the ventilator chamber is connected to the free space in the sealing medium container.

3. The piston compressor according to claim 1, wherein the sealing medium container is closed by a separating part, and a recess is arranged in the separating part, via which recess the ventilator suctions air from the sealing medium container.

4. The piston compressor according to claim 1, wherein the line is implemented as a drainage line for sealing medium or as a separate suction line.

5. The piston compressor according to claim 1, wherein a heat exchanger is arranged in the hydraulic unit, through which heat exchanger the sealing medium from sealing medium container is circulated and over which the air flow flows that is blown out by the ventilator.

6. A method for purging a compressor housing of a piston compressor in which a sealing arrangement for sealing a reciprocating piston rod of the piston compressor is arranged, and the sealing arrangement is supplied with pressurized sealing medium via a hydraulic unit, and a ventilator in the hydraulic unit suctions air from the interior of a sealing medium container, wherein the interior of the sealing medium container is connected to the compressor housing so that purge gas is suctioned through an opening in the compressor housing and the compressor housing is purged therewith.

7. The method according to claim 6, wherein the ventilator is operated for a given time period prior to the startup of the piston compressor.

\* \* \* \* \*